Figure 1:
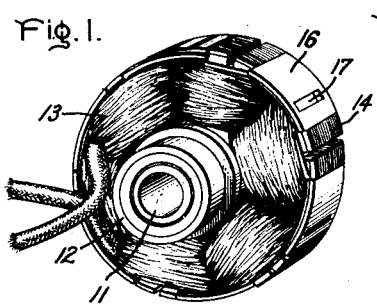

Oct. 31, 1933.    W. J. MORRILL    1,933,498
ALTERNATING CURRENT MOTOR
Filed Feb. 16, 1932

Inventor:
Wayne J. Morrill,
by Charles V. Mullan
His Attorney.

Patented Oct. 31, 1933

1,933,498

UNITED STATES PATENT OFFICE 1,933,498

ALTERNATING CURRENT MOTOR

Wayne J. Morrill, Fort Wayne, Ind., assignor to General Electric Company, a corporation of New York Application February 16, 1932. Serial No. 593,271

14 Claims. (Cl. 172—278)

My invention relates to alternating current motors, and its application is particularly beneficial to small motors of the induction type.

In the construction of dynamo-electric machines, it is a well known fact that in large machines the copper losses are relatively small, whereas in small machines the reverse is true. For example, in a large turbine generator the copper losses may be about .1 per cent of the rating, while in a ¼ horse-power washing-machine motor the primary copper loss is commonly as high as 20 per cent of the rating, and is proportionately higher in smaller motors. On the other hand, the relative iron losses do not increase in anything like this proportion as we go to machines of small size.

It is, therefore, of importance in the building of small machines to reduce the copper losses as much as possible, even if it be necessary to increase the iron losses somewhat. If this is accomplished by merely increasing the section of the windings, we add to the cost, weight, and physical dimensions of the machine, with no resultant overall gain. However, if we can reduce the length of the winding turns, we may expect to reduce the copper losses without undue sacrifice in other respects.

One object of my invention is to reduce the copper losses and improve the efficiency of dynamo-electric machines, particularly small induction motors. Another object of my invention is to provide an induction motor with a new form of secondary designed for low resistance and correspondingly good speed regulation and with low inertia. Other objects of my invention will appear as the description proceeds.

The secondary element of an induction motor built in accordance with my invention is radically different in structure from the conventional design. This secondary element may comprise a magnetic circuit built in the form of a cup with the cylindrical wall slotted in an axial direction. The flux from the conventional primary enters and leaves the slotted cylindrical portion at different circumferential points, and in order to pass from one point to the other through the secondary it must pass in axial directions through the slotted portions to the unslotted end section. The secondary winding may then comprise short bars extending radially through the bottom of the slots, with inner and outer end rings joining the bars together. The dimensions of the end rings of such a secondary winding are about the same as in the conventional squirrel cage winding, but the amount of copper in the bars is very materially less, and the resistance of the winding as a whole is materially less than in the conventional motor. The effective area of the magnetic circuit of the secondary which is exposed to the rotating magnetic field of the primary is thus comparable to that in the usual induction motor secondary, but the cross-sectional area of the secondary magnetic circuit at the points where it threads the secondary winding is only a small fraction of the air gap area, and I obtain in effect a restricted throat in the secondary magnetic circuit, through which the secondary flux is funneled, so to speak, and place the secondary winding about this restricted portion, thereby greatly reducing the length of the turns in the secondary winding. This principle of design may be carried out in various ways, as will be hereinafter explained.

Figure 2:
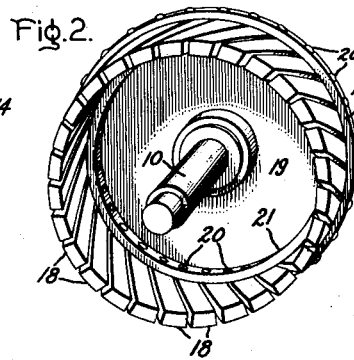
Figure 3:
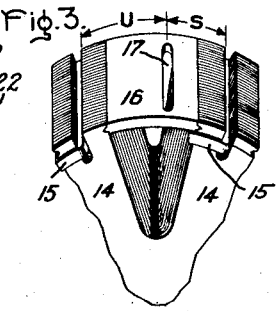
Figure 4:
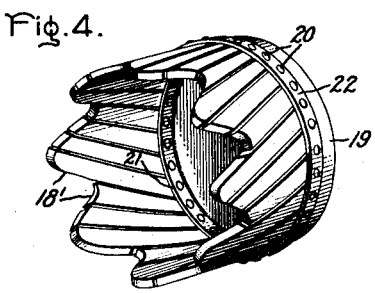
Figure 5:
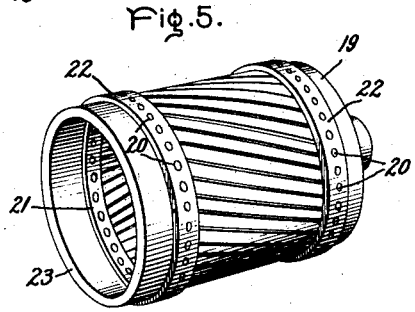
Figure 6:
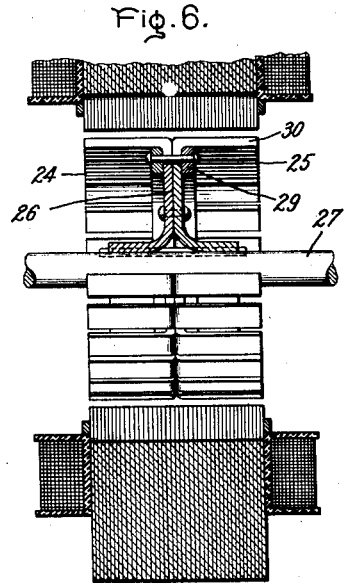
Figure 7:
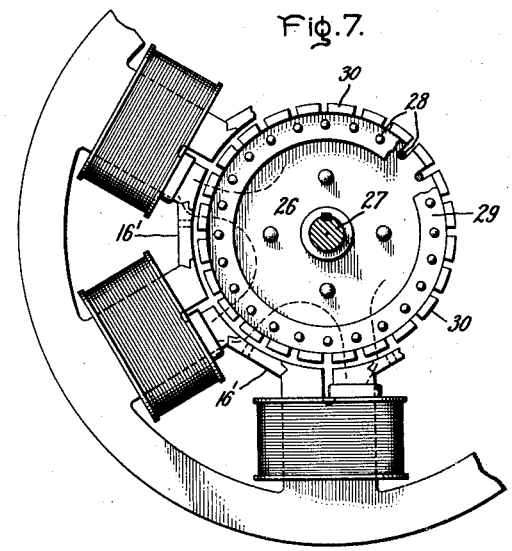
Figure 8:
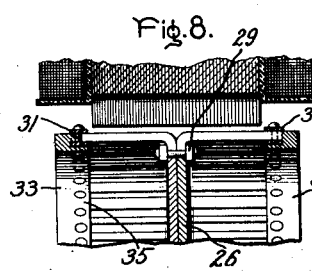
Figure 9:
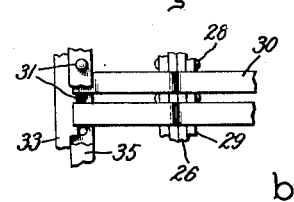

This and other novel features of the invention will be pointed out in the claims appended hereto. For a better understanding of the invention reference is made in the following description to the accompanying drawing, in which Fig. 1 represents a primary stator element of the shaded pole variety that may be used with the forms of external rotor secondaries shown in Figs. 2, 4 and 5; Fig. 3 shows a portion of the primary of Fig. 1 without the primary winding, to better illustrate the shading pole arrangement; Fig. 2 is a single winding secondary rotor member together with its shaft; Fig. 4 is a single winding secondary rotor member having its magnetic material cut to form polar salients so that it will operate at a synchronous speed; Fig. 5 represents a two-winding secondary rotor member; Figs. 6 and 7 are partial sectional plan and end views of a motor built in accordance with my invention, where the rotor is the inner element; Fig. 8 represents portions of a motor of the general type shown in Figs. 6 and 7, but with the rotor secondary provided with three windings; and Fig. 9 is a detail plan view of a portion of the secondary member of Fig. 8.

The structures of Figs. 1 to 5, inclusive, are for that style of dynamo-electric machine sometimes referred to as the umbrella type, due to the shape of the rotor, which fits over the stator in a manner somewhat resembling an open umbrella. The rotor shaft 10 passes through a central opening 11 in the stator element, and a pedestal (not shown) embraces the hub-like projection of the stator, represented at 12, and supports the machine, usually at one end only. The manner of supporting this type of motor as a whole and the bearing arrangements are well known in the art and need not be gone into here. The primary stator element shown in Fig. 1 is represented as a six-pole member, the primary winding 13 consisting of six coils wound on the salient poles 14 to form alternate north and south poles. As best shown in Fig. 3, where the primary coils are omitted, this stator is of the shaded pole variety, it having shading coils 15. The novel features of my secondary member are obviously not limited to any particular form of primary, and may be used with a polyphase type of distributed primary winding primary member; but in motors of small sizes, where the present invention is particularly advantageous, the simplicity of a shaded pole primary such as is represented is generally to be preferred.

As shown in Figs. 1 and 3, the pole pieces are connected at their outer ends by a bridging member 16 suitably morticed into the pole tips and conforming to the peripheral curvature of the stator. These bridging members are of magnetic material and extend materially the pole face areas of the stator element. These bridging pieces are each provided with an opening 17 extending nearly across the piece, leaving only enough material at the edges to give the desired mechanical strength. Such openings or air gaps constitute the dividing line between the magnetic pole sections of the stator. Thus, in Fig. 3, the distance U represents the peripheral dimension of the unshaded pole face area and the distance S represents the peripheral dimension of the shaded pole face of the adjacent pole.

It will be apparent that these bridging pieces 16 may be removed and exchanged for others having a greater width of opening 17, or having the opening located more to the right or left, as desired, to vary the relative dimensions of the shaded and unshaded pole face sections of the motor. A relatively large pole face is provided without necessitating a correspondingly large pole section about which the coils are wound, and this helps in reducing the length of primary winding turn for a given effective pole face area. The bridges also assist in retaining the coils in place, as well as serving as a protective covering therefor.

Referring, now, to the secondary rotor structure of Fig. 2, the magnetic portion comprises a cup-shaped member with the cylindrical portion slotted in an axial direction, leaving spaced fingers or bars 18 of magnetic material magnetically united by the end portion 19. The slots are slightly spiraled, which is not essential but makes for smoother starting and more nearly noiseless operation. When assembled on the stator, the magnetic fingers extend over and closely adjacent the stator pole faces, and the flux path at a given instant is from the stator poles of one polarity radially into the adjacent fingers 18 of the rotor, then axially to the end plate 19, which is outside the direct influence of the rotating magnetic field, then across the end plate to other fingers which extend over the adjacent stator poles of opposite polarity and then axially through these latter fingers and then radially back into the stator. The slotted cylindrical rotor when assembled is separated from the stator by the usual small air gap, as shown for instance in Figs. 6, 7 and 8. The primary flux field is, of course, essentially a rotating magnetic field due to the shaded poles and alternating current excitation. This rotating magnetic field, following the path of least reluctance through the rotor, is necessarily diverted through the end plate 19 in passing between the stator poles of opposite polarity. The spiraling of the bars or fingers 18 is not sufficient to bridge between adjacent stator pole portions or opposite magnetic polarity, and, in fact, if the flux attempted to take a short cut crosswise of these fingers it would have to cross several of the intervening air gaps between the fingers 18. Thus, the motor fluxes in passing through the rotor pass into and out of the end plate 19 through the fingers 18.

I place a secondary induction motor winding in the path of this flux through the rotor, consisting of short copper bars 20 in the end of the slots adjacent the end plate 19, and connect these bars by inner and outer copper end rings 21 and 22. This is the equivalent of a squirrel cage winding, except that the bars are radial instead of axial, and are, moreover, very much shorter. The resistance of this winding is very materially less than that of the usual squirrel cage winding, and the amount of copper used is also materially less. The inertia of this rotor is low and the construction is such that it is well balanced mechanically. Owing to the very low resistance secondary winding, the speed regulation is very small; i. e., there is very little change in speed between no load and full load, and likewise very little change in speed for ordinary voltage variations.

The rotor of Fig. 4 is the same as that of Fig. 2, with the exception that the cylindrical slotted portion is provided with salient poles for synchronous operation. The open ends of the magnetic bars 18' are cut off in accordance with a sine wave providing an 8-pole synchronous induction motor rotor. The salient poles could likewise be formed by evenly spaced radial scallops in the cylindrical portion of the cup, corresponding to the pole number desired.

In Fig. 5, I have shown a rotor provided with two secondary windings, one at each end of the cylindrical slotted portion of the rotor and with the slots magnetically closed at both ends. In this figure the right-hand end of the rotor is the same as shown in Fig. 2, with the end plate 19 for connection to the shaft. The opposite end is left unslotted for a suitable distance, providing a magnetic end band 23 which serves the same purpose of the end plate 19, of conveying the flux in a circumferential direction. Two secondary windings with radial bars 20 and end rings 21, 22 are provided, and the induction motor action is divided between them, since the flux through the rotor will now take parallel paths, part going through the end plate 19 and part going through the band 23 in passing from pole to pole of the stator. This arrangement balances the endwise magnetic pull on the rotor and also permits increasing the capacity of the motor.

In the remaining figures the machine is arranged to have the primary stator element outside the rotor. A shaded pole stator is shown, and removable slotted magnetic bridges 16' are provided between the pole tips for the same purpose as explained in connection with Figs. 1 and 3. In Figs. 6 and 7, the rotor comprises a pair of magnetic members 24 and 25 having solid radial sections 26 bolted together and forming a central spider suitably keyed or otherwise secured to the shaft 27. The exterior portions or these magnetic members are bent away from each other, parallel to and concentric with the shaft, and the resulting cylindrical surface is slotted, forming bar sections 30 adjacent the inwardly projecting stator pole pieces. The slots extend slightly beyond the inward bend to the spider section, leaving room for the secondary winding consisting of copper bars 28 in the bottoms of the slots, and copper end rings 29 beneath the cylindrical portion which not only serve as an effective squirrel cage secondary winding, but assist in clamping the rotor structure together.

The outer ends of the bar sections 30 are not magnetically connected in Figs. 6 and 7 so that all of the flux from the stator must pass down into the solid spider section in order to pass in a circumferential direction between stator pole pieces of opposite polarity. This is indicated in dotted lines in Fig. 7 at the instant when the flux is largely through the shaded pole portions of the stator. This flux must, therefore, cut the secondary winding, and torque is produced.

Figs. 8 and 9 show the general form of motor of Figs. 6 and 7, but with the addition of secondary windings at each end of the rotor at 31 and 32. The outer ends of the magnetic bars are bridged by magnetic end bands 33 and 34, and the secondary windings 31 and 32, having short radial bars connected by inner and outer end rings, are placed at the outer ends of the slots, which are now closed magnetically by the bands 31 and 32. In this embodiment, the flux through the rotor has three parallel paths, with a secondary winding in the path of each. The parts will be suitably proportioned to obtain the desired flux distribution and induction motor action between the three secondary windings and the winding characteristics may vary. For example, the end windings may be designed for higher resistances than the central winding. In the arrangement shown, the magnetic end bands 33 and 34 are clamped in place by the bars of the secondary windings which extend through an inner extension 35 of such bands.

The last described style of motor can be made synchronous by providing salients in its magnetic circuit corresponding to the pole number. For example, in Fig. 7 I have shown a 6-pole motor having twenty-four magnetic bar sections 30 in the secondary. I may then omit every fourth bar, which will give the secondary circuit a salient pole effect.

It will be appreciated that this form of rotor has a very low resistance secondary, and that the slip will be very small. It also has low inertia, so that only a small salient pole effect is necessary to obtain the synchronous pull in torque necessary for synchronous operation. The amount of load that the motor will carry at synchronous speed will, of course, vary with the amount of salient pole effect incorporated in the design, and it will be obvious that this may vary and may be produced in various ways.

It will be evident that the forms of rotors shown in Figs. 2, 4, and 5 may be used with an external stator such as is shown in Fig. 6, and in all cases the primary member might be made the rotor without departing from the novel features of the invention.

What I claim as new and desire to secure by Letters Patent of the United States, is:

1. A secondary member for alternating current motors of the multi-polar rotating magnetic field type, comprising a cup-shaped member of magnetic material, the cylindrical portion of which is slotted in an axial direction from end to end, the base portion of the cup remaining solid, such that the path of least reluctance for flux between two circumferentially spaced points on the cylindrical surface separated by one or more slots is by way of the solid base portion, and a short-circuited secondary winding on said member comprising short radial conductors in the bottom of the slots in said cup-shaped member adjacent the base portion, an internal conducting ring and an external conducting ring joining the radial conductors internally and externally of said member.

2. An alternating current motor comprising a primary member having means thereon for producing a multi-polar rotating magnetic field, a relatively rotatable secondary member having a magnetic circuit including a plurality of spaced apart magnetic bars lying closely adjacent to and within the influence of the primary rotating magnetic field, said bars extending in directions transverse to the direction of the rotating magnetic field and to points external to the influence of the primary rotating magnetic field, a plurality of magnetic means magnetically joining said bars at different points external to the influence of the primary rotating magnetic field, said magnetic joining means being included in parallel magnetic paths for the motor flux through the rotor, and short-circuited secondary windings through which said magnetic bars extend, said windings being cut by the fluxes in the parallel magnetic circuits flowing through said bars to and from the magnetic joining means.

3. An alternating current motor comprising a primary member having means thereon for producing a multi-polar rotating magnetic field, a relatively rotatable secondary member having a magnetic circuit comprising a plurality of spaced apart magnetic bars lying closely adjacent to and exposed to the primary rotating magnetic field, said bars extending in directions transverse to the direction of rotation of said field, and magnetic means included in said magnetic circuit for magnetically joining said bars together at points removed from the direct influence of the primary rotating magnetic field, and a short-circuited secondary winding through which said bars extend at points closely adjacent to said magnetic joining means so that said winding is cut by the flux flowing through said bars to and from the magnetic joining means.

4. An alternating current motor comprising a primary member having means thereon for producing a multi-polar rotating magnetic field, a relatively rotatable secondary member the magnetic circuit of which includes a plurality of spaced apart magnetic bars exposed to the influence of the primary rotating magnetic field and extending in a direction transverse to the direction of rotation of such field, means magnetically joining said bars at points removed from the direct influence of the primary rotating magnetic field, whereby the flux through the magnetic circuit of the secondary is caused to travel along said bars to and from the points where joined magnetically, and a short-circuited secondary winding through which said bars extend between the points where the bars are magnetically joined and the points within the influence of the primary rotating magnetic field.

5. An alternating current motor having a primary member for producing a rotating magnetic field, and a relatively rotatable secondary member comprising axially extending bars of magnetic material spaced apart in a cylindrical arrangement and exposed to the rotating magnetic field, the latter rotating in a direction transverse to the bars, means for magnetically joining said bars together external to the direct influence of the rotating magnetic field such that different bars and the magnetic joining means therefor are in series relation in the flux circuit of the secondary and a short-circuited secondary winding in the path of said flux.

6. An alternating current motor having a primary member for producing a rotating magnetic field, a relatively rotatable secondary member therefor comprising a plurality of magnetic bars spaced apart and extending in an axial direction forming a slotted magnetic cylinder, the bars being slightly spiraled about the cylinder and exposed to the rotating magnetic field, the latter rotating in a direction transverse to the bars, magnetic means external to the direct influence of said rotating magnetic field joining said bars together such that the flux through the rotor flows axially along said bars to and from the magnetic joining means, and a short-circuited secondary winding thereon in the path of said flux.

7. An alternating current motor comprising means for producing a rotating magnetic field, a relatively rotatable secondary member having magnetic bars spaced apart and disposed within the influence and transversely to the direction of rotation of said field, magnetic means joining said bars together outside the direct influence of said rotating magnetic field such that the path of the flux from said field through said secondary is along said bars to and from the magnetic joining means, the magnetic material of said secondary being further arranged to produce salient poles with respect to said rotating magnetic field and a short-circuited secondary winding in the path of the flux through said secondary.

8. A salient pole secondary member for induction motors comprising a cup-shaped member of magnetic material with the wall portion of the cup slotted in an axial direction and the base portion unslotted, and with the open end portion of the cup scalloped to form magnetic salients and a short-circuited secondary winding comprising short conductors through the slots in the cup adjacent the base portion, and internal and external conductor bands joining the ends of said conductors together.

9. A salient pole secondary member for induction motors comprising a cup-shaped member of magnetic material with the wall portion of the cup slotted in an axial direction and the base portion unslotted and a short-circuited secondary winding comprising short conductors through the slots in the cup adjacent the base portion and internal and external conductor bands joining the ends of said conductors together.

10. A secondary member for induction motors comprising a cylindrical member of magnetic material with a plurality of axially extending slots through its central portion and short-circuited secondary windings extending through said slots at their ends.

11. An alternating current motor having a primary member for producing a cylindrical rotating magnetic field, a relatively rotatable secondary member having a slotted magnetic cylinder exposed to said rotating magnetic field, the slots extending transversely of the direction of rotation of the field and forming non-magnetic barriers preventing direct passage of the flux in a tangential direction through said cylinder, magnetic means external to the influence of said rotating magnetic field bridging the slots in the cylinder at the ends and at the center of the cylinder whereby the fluxes through the rotor flow lengthwise in the slotted cylindrical member to and from said magnetic bridging means, and short-circuited secondary windings in the path of the fluxes closely adjacent the magnetic bridging means.

12. An alternating current motor having an external primary member for producing a cylindrical rotating magnetic field, a relatively rotatable secondary member in said field, said secondary having a cylindrical peripheral portion exposed to the rotating magnetic field and a central spider portion supporting the cylindrical portions, said portions being made of magnetic material and having axially extending radial slots through the cylindrical portion extending into the spider portion, leaving the inner portion of the spider portion unslotted, and a squirrel cage winding having bars in the slots of the spider portion and end rings joining said bars beneath the cylindrical portion.

13. An induction motor having a primary member for producing a rotating magnetic field and a relatively rotatable secondary member provided with a magnetic circuit and a short-circuited secondary winding, the magnetic circuit of the secondary having restricted sections the total cross-sectional area of which is a small fraction of the area of the magnetic circuit of the secondary which is directly exposed to the rotating magnetic field of the primary, the secondary winding closely surrounding said restricted sections.

14. An alternating current motor of the induction type having a primary member for producing a rotating magnetic field and a relatively rotatable secondary member having an open slot magnetic circuit and a short-circuited secondary winding in the slots thereof, the magnetic circuit of the secondary having a relatively large effective air gap area directly exposed to the rotating magnetic field of the primary and restricted portions having a relatively small total cross-sectional area at points where the magnetic circuit threads the secondary winding, the effective area of the magnetic material directly exposed to the rotating magnetic field of the primary being several times greater than the cross-sectional area of the magnetic circuit which is surrounded by the secondary winding.

WAYNE J. MORRILL.